March 3, 1942.         G. M. MAGRUM         2,275,372
SHOCK ABSORBING STRUCTURE FOR AIRPLANE LANDING GEARS
Filed Dec. 29, 1939         3 Sheets-Sheet 1
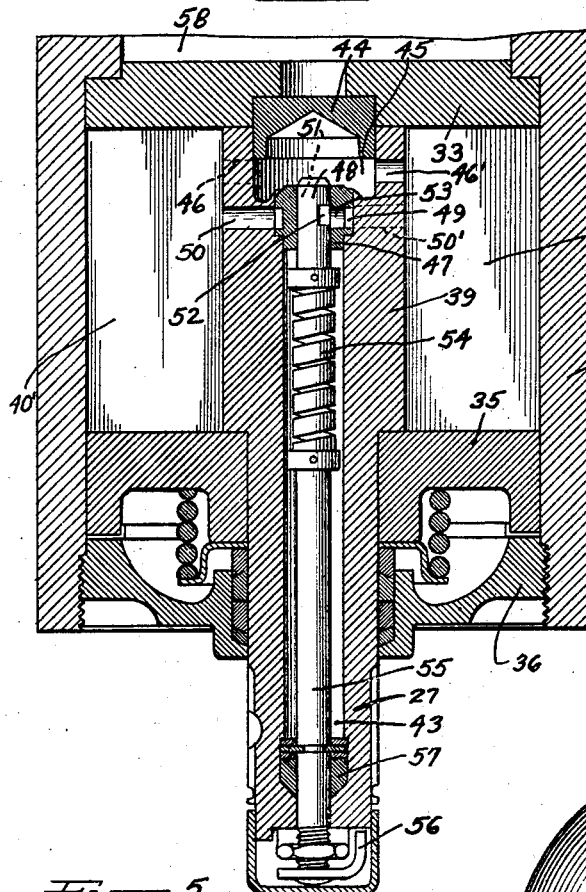
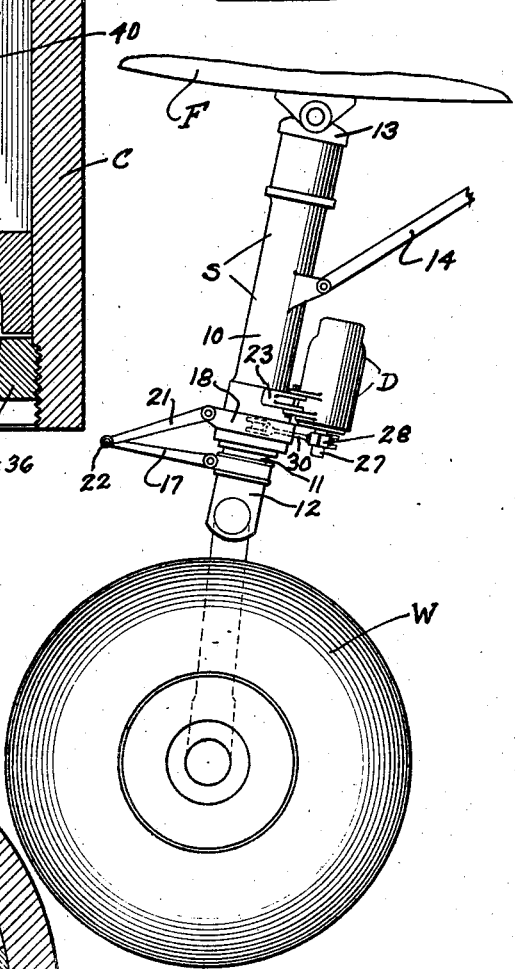
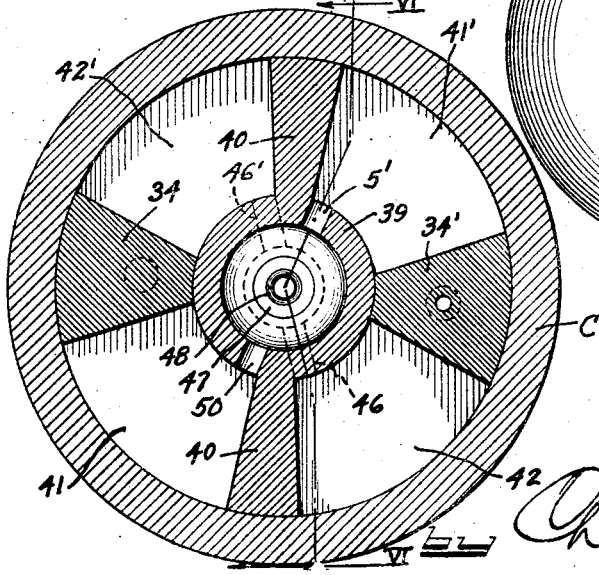
Inventor
GERVASE M. MAGRUM

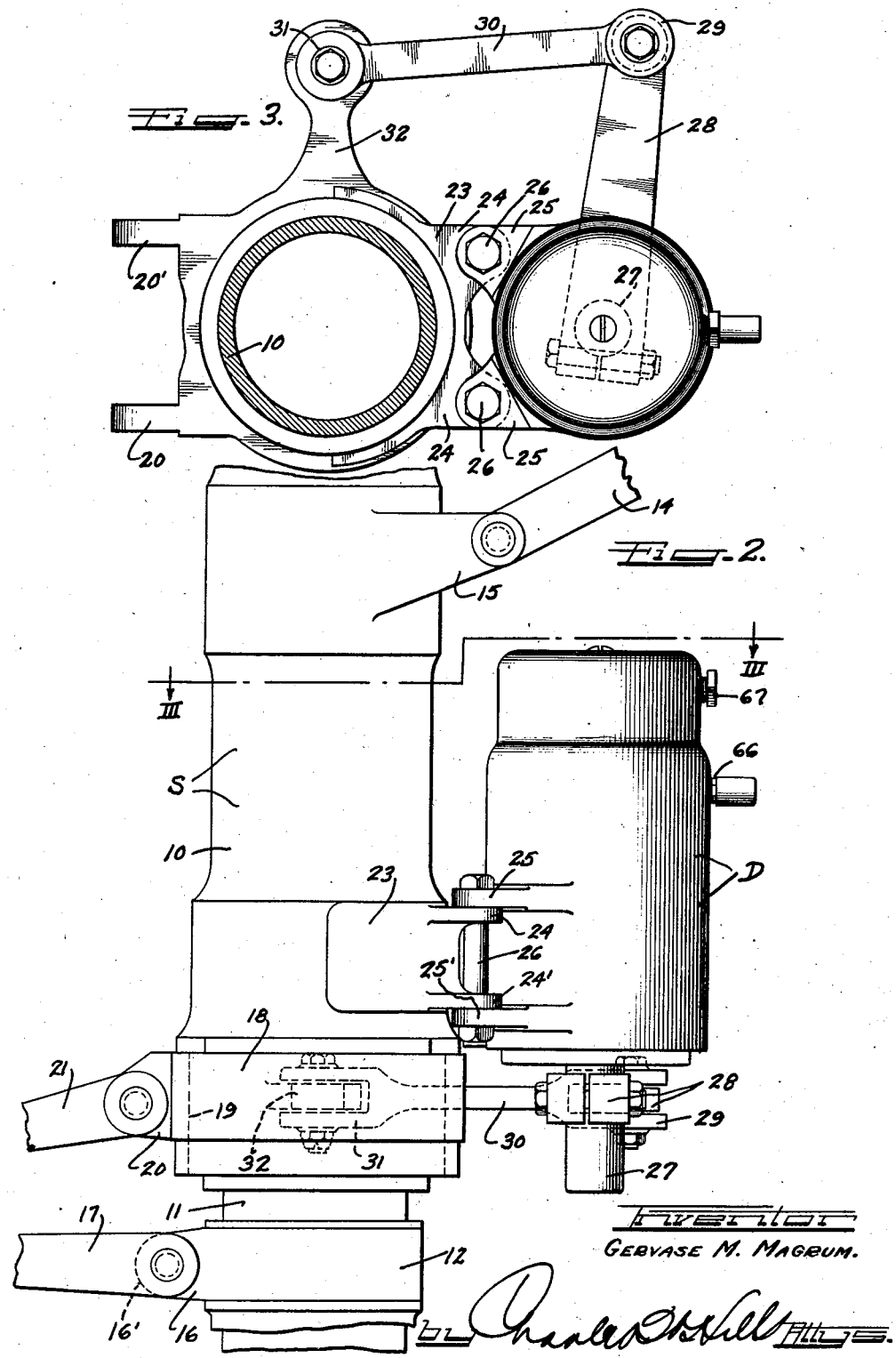

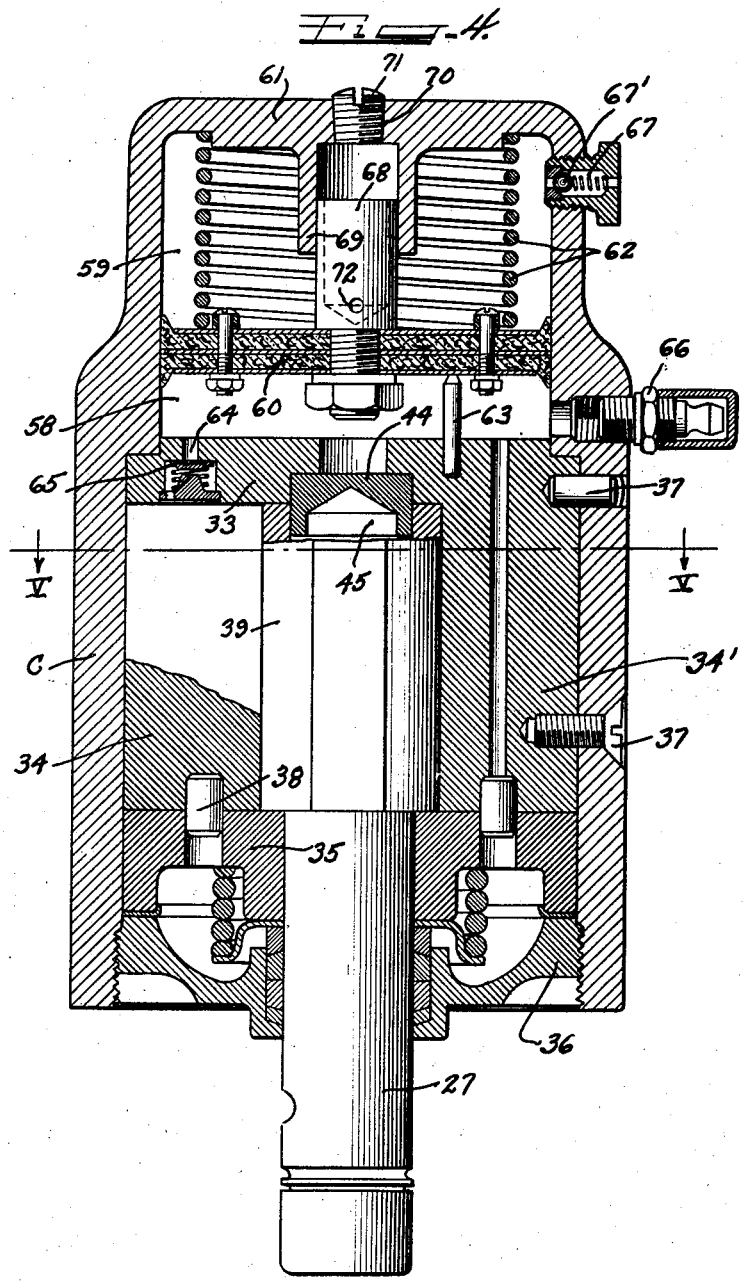

Patented Mar. 3, 1942

2,275,372

UNITED STATES PATENT OFFICE 2,275,372

SHOCK ABSORBING STRUCTURE FOR AIRPLANE LANDING GEARS

Gervase M. Magrum, Buffalo, N. Y., assignor to Houde Engineering Corporation, Buffalo, N. Y., a corporation of New York Application December 29, 1939, Serial No. 311,489

6 Claims. (Cl. 244—100)

My invention relates to hydraulic shock absorber structure and association thereof with landing gears of air craft for dampening caster or shimmy movement of wheels of the landing gears. My invention is particularly adaptable and desirable for efficiently controlling any shimmy or wobble movement of the caster wheel of three wheel landing gears, such as the tricycle type, without materially interfering with the free castering movements of the wheels.

On the drawings which illustrate one embodiment of my invention.

Figure 1 is a side elevation of a strut extending from an airplane body for mounting a wheel, and shock absorber structure mounted on the strut and connected with the wheel for dampening the caster movement of the wheel;

Figure 2 is an enlarged side elevation of the strut and shock absorber structure;

Figure 3 is a section on plane III—III of Figure 2;

Figure 4 is an enlarged vertical diametral section of the shock absorber;

Figure 5 is a section on plane V—V of Figure 4; and

Figure 6 is a section on plane VI—VI of Figure 5.

I have shown a so-called shock absorber strut S comprising a tubular body structure or cylinder 10 with a plunger or rod 11 operable therein, the plunger at its outer end having a yoke structure 12 secured thereto for journalling a wheel W. Within the strut body 10 a spring, pneumatic means or hydraulic means (not shown) are provided for resisting particularly the inward movement of the plunger or piston rod 11 so that the strut structure will operate as a shock absorber for dampening and controlling the vertical movement of the wheel particularly when the airplane is landing.

As shown, the strut at its upper end is provided with a fitting 13 whereby it is pivoted or hinged to the airplane body F for fore and aft swinging movement, and a link 14 is pivoted at its outer end to ears 15 extending from the strut body 10, this link being usually connected with mechanism (not shown) on the airplane body for operation of the link to swing the strut structure with the wheel thereon upwardly into idle position against the bottom of the airplane, and when the strut structure is lowered into its service position, the link will act as a brace.

As shown, spaced apart ears 16 and 16' are secured to and extend from the yoke structure 12 between which a link 17 is pivoted at its inner end. On the lower end of the strut body 10 a ring or collar 18 is mounted in a circumferential channel 19 and has ears 20 and 20' extending therefrom for pivotally supporting the inner end of a link 21, the links 17 and 21 at their outer ends being connected together by a pivot or hinge pin 22. Where only longitudinal movement of the plunger or piston rod 11 is desired, the ring 18 will be rigidly secured to the strut body, and the links 17 and 21 will permit such longitudinal movement of the plunger and the yoke and wheel but will hold the plunger and yoke against rotational movement. However, where rotary or castering movement of the yoke structure is desired, the ring 18 will be free to turn on the strut body 10 with the turning or castering movement of the wheel yoke, as well as vertical movement thereof communicated to the ring through the links 17 and 21.

As has already been explained, the longitudinal movement of the plunger 11 will be controlled by dampening means within the strut body 10. For dampening and controlling the rotary movement of the plunger and thereby the castering movement of the wheel structure, I provide a shock absorber structure D mounted on the strut body and connected with the ring 18.

The shock absorber structure shown comprises a cylinder element C in the form of an inverted cylindrical cup. This cylinder part is mounted alongside of the strut body with its longitudinal axis parallel with the strut axis. A supporting bracket 23 is secured, as by welding, to the strut body and presents upper and lower flanges or ears 24 and 24' for engagement by ears 25 and 25' extending from the cylinder element C, bolts 26 extending through the ears for detachably securely holding the shock absorber structure in position relative to the strut.

The shock absorber D is of the hydraulic rotary type, and the shaft 27 of the piston structure projects downwardly below the cylinder C. An arm 28 is secured to the piston shaft and extends radially therefrom and at its end receives the fork end 29 of a link 30 whose other forked end 31 receives the end of an arm 32 extending from the ring 18, so that the rotary or castering movement of the wheel structure which is communicated through the links 17 and 21 to the ring 18 will be transmitted by the link 30 to the shock absorber piston structure whose movement is hydraulically dampened and controlled for corresponding dampening and control of the wheel castering movement.

Referring to Figure 4, the cylinder C has an intermediate cross wall 33 therein which has the walls 34 and 34' extending therefrom to form hydraulic abutments. The outer wall 35 engages in the lower end of the cylinder and abuts the abutment walls 34 and 34', a clamping wall 36 threading into the cylinder end to abut the wall 35 and to hold this wall and the walls 33, 34 and 34' against axial displacement. Pins 37 extend through the cylinder wall to lock the walls 33, 34 and 34' against rotational displacement, and other pins 38 extend through the wall 35 into the walls 34 and 34' so that the wall 35 will be held against rotational displacement.

The piston shaft 27 extends from the piston hub 39 and has vanes 40 and 40' extending therefrom so that hydraulic working chambers 41, 41', 42, and 42' are defined, as shown on Figure 5.

The piston shaft and its hub has the bore 43 extending therethrough, the inner end of which is enlarged to receive the bearing plug 44 seated on the wall 33, the plug being hollow and with the large bore end forming a chamber 45 which communicates with the working chambers 42 and 42' through the passages 46 and 46' respectively extending through the piston hub. In the upper end of the bore 43 a seat bushing 47 is secured and is bored to receive cylindrical valve plug 48. The seat bushing has the circumferential channel 49 communicating with the working chambers 42 and 42' through passageways 50 and 50' respectively.

At its inner end the valve plug 48 has the passageway or bore 51 therethrough communicating with the chamber 45, and the valve plug has the circumferentially extending orifice slit 52 communicating with the passageway 53 between the channel 49 and the bore of the seat plug 47, the circumferential extent of overlap of the passageway 53 by the orifice slit 52 determining the resistance to the fluid flow between the shock absorber hydraulic working chambers.

I have shown a thermostat coil 54 secured at its inner end to the valve plug and at its outer end to the stem 55 which extends through the piston shaft bore to the exterior thereof and there provided with a lever 56 whereby the stem structure may be manually adjusted for the desired degree of exposure of the valve orifice slit and the desired shock absorbing resistance. After manual setting of the valve, the thermostat coil will respond to temperature change within the shock absorber structure so that the orifice exposure will be thermostatically adjusted to compensate for changes in viscosity of the hydraulic fluid due to temperature change. The shaft is journalled in the walls 35 and 36 and suitable packing means 57 are provided for preventing leakage along the shaft to the exterior of the shock absorber.

For efficient operation, the working chambers of the shock absorber must be kept filled with hydraulic fluid during all angular positions of the shock absorber, even when it is inverted during flight of the airplane. To accomplish this I provide replenishing structure comprising a replenishing chamber proper 58 and a replenishing compensating chamber 59. Referring to Figure 4, the plunger 60 is operable between the wall 33 and the top wall 61 of the cylinder C between the chambers 58 and 59. A compression spring 62 is interposed between the plunger and the top wall and tends to shift the plunger toward the wall 33, the stop pin 63 limiting this movement of the plunger.

The wall 33 has passageways 64 connecting the replenishing chamber 58 with the working chambers, these passages being controlled by check valve 65 normally held closed by springs and opening only for flow of fluid from the replenishing chamber to the working chambers. A filler plug 66 is provided for the replenishing chamber 58, this plug being of any well known leak proof and pressure type so that hydraulic fluid may be forced therethrough under pressure into the replenishing chamber. When fluid is forced in under pressure, the plunger 60 will be shifted outwardly against the resistance of the spring 62, and when the shock absorber is in service, the fluid in the replenishing chamber 58 will be under pressure at all times during operation of the shock absorber and the working chambers will be kept full at all times, even when the shock absorber is upside down during flying of the airplane.

The compensating chamber 59 does not receive fluid when the replenishing chamber 58 is charged with fluid under pressure, but should any fluid leak past the plunger, or should any air accumulate in the chamber 59, such fluid and air will be discharged from the chamber through the vent passageway 67 controlled by a check valve 67' which opens the passageway only for expulsion of the fluid and air from the chamber.

For guiding the movement of the plunger 60 it is provided with a guide extension 68 engaging in the guide wall 69 extending from the top wall 61 of the cylinder. A passageway 70 in the top wall closable by a plug 71 is provided so that gauge means may be inserted for gauging the setting of the plunger when the replenishing chamber is charged with fluid under pressure. The guide extension 68 is hollow and provided with a vent port 72 so as to keep the pressure at the outside and the inside of the guide extension equalized.

I thus produce an improved assembly of shock absorber and strut for controlling and dampening oscillation, wobbling, or shimmy of an airplane supporting wheel, particularly a caster wheel, and without materially interfering with the proper caster movement. When the strut structure is swung up to idle position on the airplane, and the airplane is maneuvering, the hydraulic working chambers of the shock absorber will be kept properly filled with hydraulic fluid so that the shock absorber will at all times be ready to function for control of the wheel when the strut structure is swung down into service position for landing of the airplane.

I have shown and described an efficient and practical embodiment of the invention, but I do not desire to be limited to the exact construction, arrangement and operation shown and described, as changes and modifications may be made without departing from the scope of the invention.

I claim as my invention:

1. An airplane supporting structure comprising a strut adapted to be secured to an airplane to depend therefrom, a caster yoke supported by said strut for caster movement thereon and adapted to journal a ground engaging wheel, a hydraulic shock absorber comprising a cylinder structure in the form of an inverted cup and a rotary piston structure therein, means mounting said cylinder element rigidly on said strut alongside thereof and with its longitudinal axis paralleling the strut axis, a shaft for the piston element projecting below the lower end of said cylinder element, and a connection between said yoke and piston shaft for transmitting the castering movement of said yoke to the piston element whereby said shock absorber will function to dampen and control the castering movement of said wheel.

2. An airplane supporting structure comprising a strut adapted for connection with the airplane to depend therefrom, a caster yoke mounted on said strut for rotational or castering movement and adapted to journal a ground engaging wheel, a hydraulic shock absorber of the rotary type comprising a cylinder element and a piston element having a shaft projecting a distance beyond the lower end of the cylinder element, means rigidly securing said cylinder element to said strut alongside thereof with its longitudinal axis parallel with the strut axis, and a connection between said yoke and said piston shaft for transmitting the castering movement of said yoke and wheel to said piston structure whereby said shock absorber will dampen and control the castering movement of said wheel.

3. An airplane supporting structure comprising a tubular strut adapted to be secured to an airplane to depend therefrom, a plunger having longitudinal and rotational movement in said strut and terminating in its lower end in a yoke adapted to journal a ground engaging wheel, a hydraulic shock absorber of the rotary type comprising a cylinder element and a piston element therein, means mounting said cylinder element on said strut alongside thereof, a shaft for said piston element projecting a distance from the lower end of said cylinder element, an arm on the lower end of said shaft, a ring rotatable on said strut and having an arm extending therefrom, a link connecting the ends of said arms, connecting means between said wheel yoke and ring for transmitting the rotating or castering movement of said yoke to said ring whereby said shock absorber will function to dampen and control the castering movement of said yoke and wheel, said connection being expansible and contractible for permitting longitudinal movement of said yoke.

4. An airplane supporting structure comprising a strut adapted for attachment to an airplane to be suspended therefrom, a yoke structure supported by said strut for caster movement and adapted to journal a ground engaging wheel, a hydraulic shock absorber of the rotary type comprising a cylinder element and a piston element therein, means mounting said cylinder element on said strut alongside thereof, a supporting shaft for the piston element projecting a distance below the lower end of said cylinder element, an arm extending from said piston shaft, a rotatable member on said strut having an arm extending therefrom, a link connecting the ends of said arms, and a connection between said yoke and rotatable member for transmitting the castering movement of said yoke to said rotatable member whereby said piston structure will follow but will dampen and control the caster movement of said yoke and wheel.

5. An anti-shimmy arrangement for a castering ground engaging wheel of an airplane landing gear comprising a tubular strut adapted to be suspended from the airplane, a wheel carrying structure rotatable in said strut and adapted to mount said ground engaging wheel, a hydraulic shock absorber comprising a cylinder element and a piston element, one of said shock absorber elements being rigidly mounted on said strut, and connections between said wheel carrying structure and the other shock absorber element for transmitting rotary movement of said wheel carrying structure to the piston element whereby said shock absorber will hydraulically control and dampen the castering movement of said wheel.

6. An anti-shimmy arrangement for a castering ground engaging wheel of an airplane landing gear comprising a tubular strut adapted to be suspended from the airplane body, a wheel carrying structure rotatable in said tubular strut and adopted at its lower end to mount said ground engaging wheel, a hydraulic shock absorber comprising a cylinder element rigidly mounted on said strut alongside thereof and a piston element having a shaft projecting from said cylinder, and a connection for transmitting the rotational movement of said wheel carrying structure to said piston element whereby said shock absorber will function to dampen and control the castering movement of said wheel carrying structure and wheel.

GERVASE M. MAGRUM.